J. G. WEIR.
Wheelbarrow.
No. 98,324.    Patented Dec. 28, 1869.
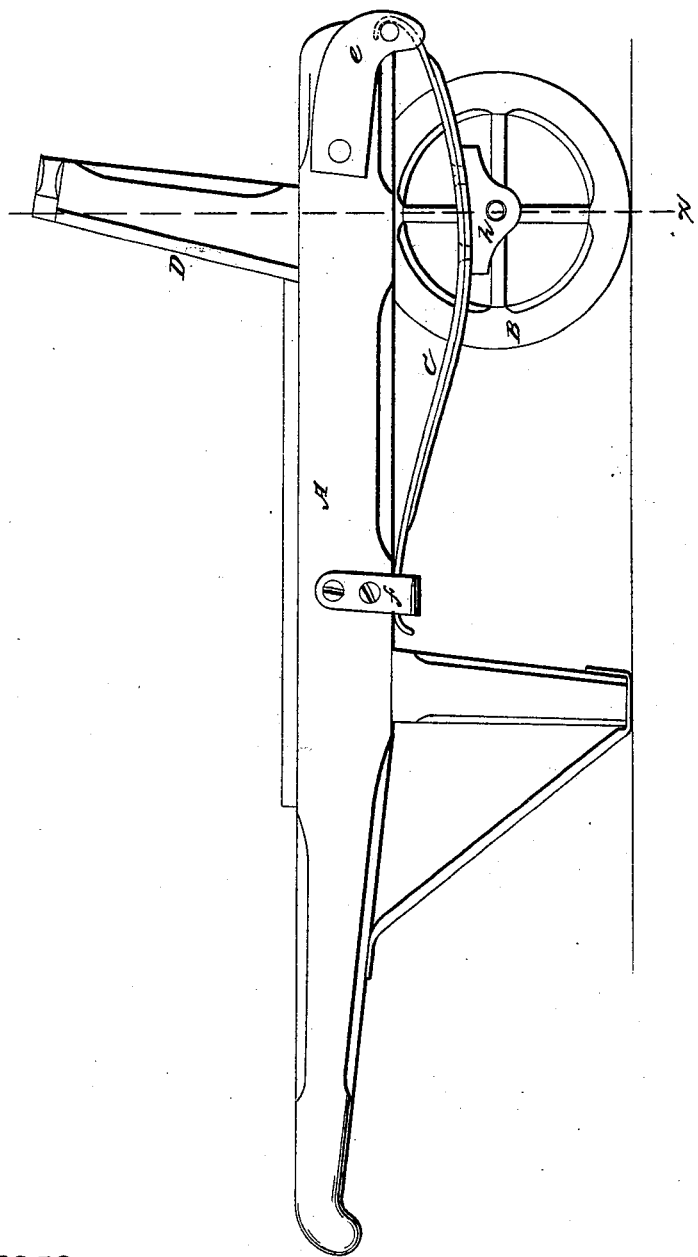
WITNESSES:
John Lockie
N. S. Miller
INVENTOR:
James G. Weir
By his attorney James L. Johnston

United States Patent Office.

JAMES G. WEIR, OF PITTSBURG, PENNSYLVANIA.

Letters Patent No. 98,324, dated December 28, 1869.

IMPROVEMENT IN WHEELBARROWS.

The Schedule referred to in these Letters Patent and making part of the same.

*To all whom it may concern:*

Be it known that I, JAMES G. WEIR, of Pittsburg, in the county of Allegheny, and State of Pennsylvania, have invented a new and useful Improvement in Wheelbarrow for Brickmakers; and I do hereby declare that the following is a full, clear, and exact description thereof, reference being had to the accompanying drawings, and to the letters of reference marked thereon.

The nature of my invention consists in pivoting the wheel of a wheelbarrow to springs, which are so secured to the frame of the barrow as to yield to the least jostling action of the wheel, thereby relieving the barrow from jarring the whole being constructed and operating as hereinafter described.

To enable others skilled in the art to make and use my invention, I will proceed to describe its construction and operation.

In the accompanying drawing, which forms part of my specification—

A represents an ordinary wheelbarrow.

B represents the wheel of the same.

The wheel B is pivoted in the springs C, so that the centre of the wheel B shall be directly under the head-piece D, as indicated by the dotted line $x$.

By thus placing the centre of wheel under the head-piece, the weight of the load will not be so heavy on the operator, and he will be better enabled to guide and manage the loaded barrow.

The springs C are secured at their front ends to the front end of the frame of the barrow, by means of the lugs $e$, and the back ends of the springs slide in the guides $f$.

The bearings $h$, of the axle of the wheel, are secured to the springs C by means of rivets or bolts.

As the construction and arrangement of the several parts of my improvement in wheelbarrows will readily be seen and understood by reference to the accompanying drawings, I will therefore proceed to describe the operation.

When the barrow is loaded with green brick, (which must be manipulated with care,) and when moving the barrow with its load from one place to another, in case the wheel B should come in contact with any obstruction on or indentation in the ground, road, or way, the jar of the wheel will be upon the springs C, the back ends of which will move in the guides $f$, and thereby relieve the barrow from the effect of the jolt or jar of the wheel, and the sliding back of the springs C will also relieve the arms of the operator from the jerking action of the barrow, which would otherwise follow.

I am aware that the wheel of a wheelbarrow has been attached to springs; therefore, I do not claim broadly attaching the wheel of a wheelbarrow to springs; but

What I claim, as of my invention, is—

Pivoting the wheel B to springs C, with the centre of the wheel directly under the head-piece D, said springs being so arranged with relation to the wheel B and frame A, that their back ends will slide in guides $f$, as herein described, and for the purpose set forth.

J. G. WEIR.

Witnesses:
JAMES J. JOHNSTON,
JOHN LOCKIE.